United States Patent [19]
DeVita et al.

[11] 4,176,351
[45] Nov. 27, 1979

[54] METHOD OF OPERATING A CONTINUOUS WAVE RADAR

[75] Inventors: Alphonse J. DeVita, Chelmsford; Earl J. Koester, Bedford; David V. Manoogian, Lynnfield; Stanley Sharenson, Stoneham, all of Mass.

[73] Assignee: Raytheon Company, Lexington, Mass.

[21] Appl. No.: 935,051

[22] Filed: Aug. 18, 1978

[51] Int. Cl.² ........................... G01S 9/37; G01S 9/44
[52] U.S. Cl. ................................. 343/9 R; 343/5 SA; 343/17.5
[58] Field of Search ................. 343/5 SA, 9, 17.5

[56] References Cited
U.S. PATENT DOCUMENTS

| | | | |
|---|---|---|---|
| 3,013,262 | 12/1961 | Tollefson | 343/9 |
| 3,197,773 | 7/1965 | Black et al. | 343/9 |
| 3,239,837 | 3/1966 | Fried | 343/9 |
| 4,079,377 | 3/1978 | zur Heiden et al. | 343/9 |

Primary Examiner—T.H. Tubbesing
Attorney, Agent, or Firm—Philip J. McFarland; Joseph D. Pannone

[57] ABSTRACT

A method of operating a continuous wave radar to derive range information as well as Doppler information is described. The transmitted signal is frequency modulated at a low modulation frequency and peak deviation so that range ambiguities are effectively avoided and echo signals may be processed at a relatively low intermediate frequency, thereby allowing echo signals from clutter to be more effectively rejected and echo signals from a moving target to be correlated.

3 Claims, 2 Drawing Figures

METHOD OF OPERATING A CONTINUOUS WAVE RADAR

BACKGROUND OF THE INVENTION

This invention pertains generally to continuous wave (CW) radar systems and particularly to a signal processing technique for processing a sine wave frequency modulated (FM) CW waveform to obtain unambiguous target range and range rate in a single radar dwell on a target.

As is known in the art, CW radars have the advantage of being able to detect targets at any range with little, if any, chance of velocity ambiguity. This capability has led to the use of CW radars in anti-aircraft missile systems for detecting low altitude targets where return signals from such targets compete with large stationary clutter returns. In such systems which are presently used, target illumination and target tracking are performed, after a particular target has been detected by a first CW radar (or CW acquisition radar), by a second CW radar (or tracking/illuminating radar). The latter types of CW radars have exceedingly low noise sidebands which permit target tracking even under severe clutter conditions.

Obviously, if the tracking/illuminating radar could be modified to derive target range and range rate in a single dwell, such a radar could perform the initial target acquisition function and thereby eliminate the need for a separate CW acquisition radar. However, to obtain range and range rate information with a CW radar necessarily implies that the CW waveform must be modulated in some manner; and a modulated waveform in turn implies that range and Doppler ambiguities may occur. Furthermore, some consideration must be given to the effects of stationary clutter. That is to say, because the 3 dB width of the ambiguity function along the range axis is a function of the transmitted bandwidth, returns from stationary clutter will have a spectral width equal to the transmitted bandwidth centered at zero Doppler frequency. Thus, returns from stationary clutter can seriously degrade the ability of a system employing a modulated waveform to detect slowly moving targets.

One known method of encoding a CW waveform is through the use of a pseudo-random coded (PRC) biphase modulation described in U.S. Pat. No. 4,042,925 to Albanese et al. In general, however, the use of broadband waveforms such as those contemplated in the cited reference requires the use of a receiver with a wide dynamic range to process the radar return signals because clutter filtering cannot be accomplished prior to correlation processing. Furthermore, to avoid the range ambiguity problem associated with PRC binary coded waveforms, a rather complex signal processor is required.

SUMMARY OF THE INVENTION

With the foregoing background of the invention in mind, it is a primary object of this invention to provide a method of modulating a CW waveform to obtain both target range and range rate from a single target dwell.

Another object of this invention is to provide a modulated CW waveform which is relatively free from range ambiguities.

Yet another object of this invention is to provide a modulated CW radar in which clutter filtering may be accomplished prior to correlation processing.

These and other objects of this invention are attained generally by providing a CW radar having a sinusoidal frequency modulated (FM) waveform with a modest value of peak deviation and a modulation rate which will permit target tracking in a high clutter environment. In such a radar, target return signals are downconverted to a first intermediate frequency (IF), filtered in a notch filter, upconverted to a second IF frequency, and passed to a bank of "N" correlation mixers whose reference signals are time delayed replicas of the transmitted signal corresponding to desired range increments. The correlated output signals are subsequently Doppler match filtered and applied to a time compression signal processor for range and Doppler processing.

BRIEF DESCRIPTION OF THE DRAWINGS

Other objects and many of the attendant advantages of this invention will be readily appreciated as the same becomes better understood by reference to the following detailed description when considered in connection with the accompanying drawings, wherein.

DESCRIPTION OF THE PREFERRED EMBODIMENT

Figure 1:
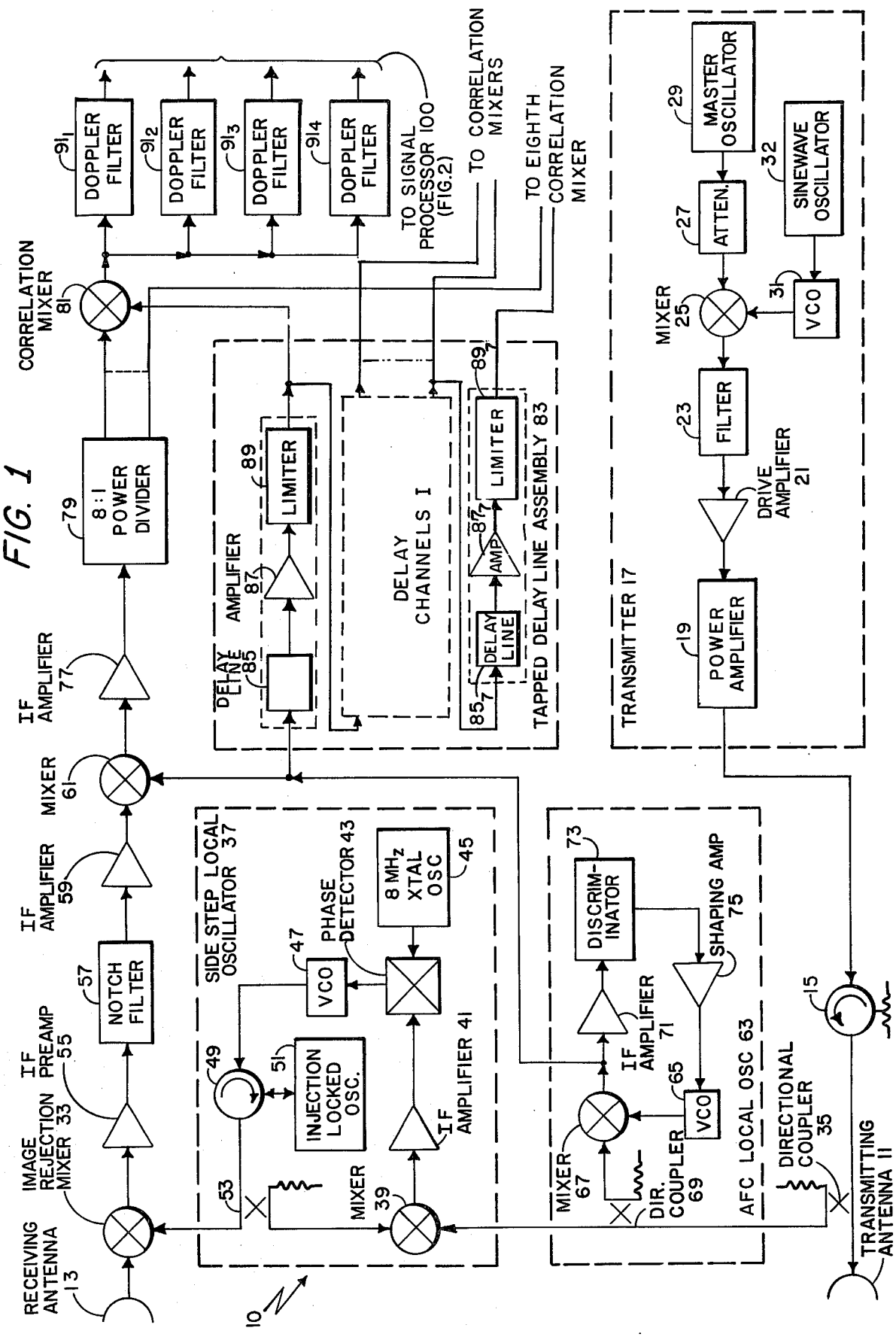
FIG. 1 is a simplified block diagram of a CW radar employing sine wave FM modulation according to this invention.

Referring now to FIG. 1, a CW radar 10 which is adapted to provide unambiguous target range and range rate (Doppler) in a single radar dwell is shown to include a transmitting antenna 11 and a receiving antenna 13. The transmitting antenna 11 is connected, via a circulator 15, to a transmitter 17. The latter, which is of conventional design, is shown to include a power amplifier 19, a drive amplifier 21, a filter 23, a mixer 25, an attenuator 27, a master oscillator 29, a voltage controlled oscillator (VCO) 31, and a sine wave oscillator 32, all of which are arranged to produce a sine wave FM modulated CW carrier signal which is transmitted by the transmitting antenna 11. Thus, the master oscillator 29, which is of conventional design and may, for example, comprise a crystal-controlled multiplier chain, is here arranged to provide an x-band CW output signal which is passed, via the attenuator 27, to the mixer 25 wherein such output signal is encoded by being frequency modulated with a ranging waveform. The ranging waveform is produced by the sine wave oscillator 32 and is here a 262 Hz sine wave having a peak carrier deviation of 3 KHz. The resulting FM modulated and upconverted CW output signal from the mixer 25 is filtered in the filter 23 to reject the undesired sidebands and then is passed, via the drive amplifier 21, to the power amplifier 19. It will be appreciated by those of skill in the art that, because of the relatively low modulation frequency (262 Hz), the ambiguous range is here on the order of $5 \times 10^5$ meters and is, therefore, of little concern in any practical missile guidance system of the type here contemplated.

Digressing now for a moment, it will be appreciated that, if the sine wave frequency modulated CW signal produced by the transmitter 17 is transmitted from antenna 11 in the direction of a target (not shown), a portion of such signal will be reflected from the target (not shown) and will be returned to the receiving antenna 13. The "round trip" transit time of the sine wave frequency modulated CW signal will cause a phase shift in the received signal compared to such signal as transmitted. Further, if the target is moving radially, the Doppler effect will be experienced to spread the frequency of the received signal over a bandwidth equal to approximately twice the peak deviation of the sine wave frequency modulated signal transmitted.

If the received signal is equally split into N channels and each of the signal channels is mixed with a different delayed version of the transmitted signal, range correlation may be obtained. Thus, if one of the instrumented delays is just equal to the actual range delay encountered by the transmitted signal, the mixing process will cause cancellation of the phase modulated term in the received signal due to the "round trip" transit time, and the resulting spectrum will resemble a tone at the unknown Doppler frequency of the target. It is noted here in passing that a finite time-on-target (TOT) will have the effect of spreading the target return signal and, therefore, a Doppler filter bank matched in frequency to approximately 1/TOT will maximize the signal-to-noise ratio and determine the proper Doppler frequency.

Considering now the signal channel just adjacent to the channel having the matched delay, the output signal spectrum from the correlation mixer in this channel will contain some residual FM as the phases of the received signal and the delayed reference will not cancel perfectly. Residual FM implies a residual deviation $\Delta F^1$ that differs from that transmitted by $$\Delta F^1 = 2\Delta F \sin\pi fm\Delta\tau \qquad \text{Eq. (1)}$$

where "$\Delta F$" is the peak deviation of the transmitted sine wave FM modulation, "fm" is the modulation rate, and "$\Delta\tau$" is the signal channel delay. The output spectrum will, however, be centered at the Doppler frequency of the target (not shown). Thus, as the peak amplitude at the Doppler frequency is reduced, with TOT long compared to "1/fm," the energy in the received signal is more and more concentrated in lines spaced about the Doppler frequency by "N fm," where "N" is an integer. As TOT is reduced, the lines become less distinct and the spectrum begins to fill in, i.e., frequency smearing is begun. In other signal channels the frequency smearing will increase because there is more residual FM due to imperfect phase cancellation in such channels. If, now, a great number of delays, each with a finite granularity, were to be instrumented, the target range could be deduced by noting for which signal channel Doppler filter bank the signal strength is greatest; and the target Doppler could be found by noting the Doppler filter in which the peak signal occurred.

As has been reported in an article entitled, "Problems of the Statistical Theory of Radar," by P. A. Bakut, et al., Soviet Radio Publishing House, Moscow 1963, a translated version of which is published in National Technical Information Service Clearing House Report No. AD 608,462, pp. 22–24, the cross-ambiguity function (meaning the ambiguity function which results after frequency weighting or, equivalently, that which results from passing a waveform through a mismatched filter) for signals with sine wave FM modulation (assuming that almost a continuum of range delays have been instrumented) resembles a bow-tie with the knot of the bow-tie being the actual location of the target in range and Doppler. The 3 dB width of such an ambiguity function along the range axis is inversely proportional to "$2\Delta F$," or twice the peak deviation of the sine wave FM modulation. The shape of the ambiguity function along the range ($\Delta\tau$) axis is identical to the $J_o$ Bessel function.

While the just-described processing system would work in a clutter-free environment, the effects of stationary clutter must be considered. Thus, it can be shown that stationary clutter would have a spectral width of "$2\Delta F$" centered at zero Doppler frequency. The returns from stationary clutter would therefore substantially degrade the ability of such a system to detect slowly moving targets in a high clutter environment. A system for rejecting the returns from stationary clutter while still retaining the transmitted deviation will now be described.

The return signals received by receiving antenna 13 are passed to an image rejection mixer 33 wherein such signals are coherently mixed with an undelayed replica of the transmitted signal (which has been upconverted by some intermediate (IF) frequency). Thus, a portion of the transmitted signal is coupled, via a directional coupler 35, to a side step local oscillator 37. The latter, which is of conventional design, is shown to include a mixer 39, an IF amplifier 41, a phase detector 43, an 8 MHz crystal controlled oscillator 45, a voltage-controlled oscillator (VCO) 47, a circulator 49, an injection-locked oscillator 51, and a directional coupler 53. The VCO 47 and, therefore, the injection-locked oscillator 51 are set to a frequency 8 MHz above that of the transmitter 17. A portion of the signal from circulator 49 is passed, via the directional coupler 53, to the mixer 39 wherein it is heterodyned with a sample of the transmitted signal. The resulting difference frequency from mixer 39 is, therefore, equal to the sum of the 8 MHz offset frequency and the 262 Hz ranging waveform. The difference frequency signal from mixer 39 is passed, via the IF amplifier 41, to the phase detector 43. The reference signal for the latter is obtained from the 8 MHz crystal controlled oscillator 45. It will now be appreciated by those of skill in the art that the output signal from the phase detector 43 is the 262 Hz ranging waveform used to encode the VCO 47 and, in turn, the injection-locked oscillator 51.

The return signals from clutter at close range will be decorrelated due to the heterodyning within the image rejection mixer 33 and the spectrum of such signals will be concentrated about the 8 MHz IF offset frequency. The degree of spectral compression is directly proportional to the proximity of the clutter to the radar 10. The spectrum of return signals from any target will also be compressed, but in direct proportion to the slant range to the target. Such spectrum will, however, be centered at a frequency equal to the sum of the 8 MHz IF frequency and the Doppler frequency of the return signals from the target.

The output signals from the image rejection mixer 33 are passed, via an IF preamp 55, to a notch filter 57 (here a conventional crystal filter) centered at the 8 MHz IF frequency. Such filter then is effective to attenuate the compressed clutter spectrum. The target spectrum, on the other hand, will not be attenuated by the crystal notch filter 41 unless its doppler frequency is quite low. It will now be appreciated by those of skill in the art that the resulting target spectrum will include a small residual FM deviation having a peak value dependent on target range. Because, as contemplated herein, target return signals are to be correlated with appropriately delayed replicas of the transmitted signal, the spectrum of target return signals from the image rejection filter 33 must have a fixed deviation corresponding to that of the transmitted signal. Such an end is here accomplished by first amplifying, in an IF amplifier 59, the filtered signals out of the notch filter 57, and then upconverting (here to an IF frequency of 35 MHz) such amplified signals in a mixer 61 to which 27 MHz IF signals encoded with the transmitted ranging waveform are also applied. The 27 MHz IF signals are obtained from an automatic frequency controlled local oscillator (AFC LOCAL OSC 63). The latter, which is of conventional design, comprises a VCO 65 which is offset by 27 MHz from the transmitted frequency. The output signal from the VCO 65 is heterodyned in a mixer 67 with samples of the transmitted signals obtained via a directional coupler 69. An AFC loop comprising an IF amplifier 71, a discriminator 73, and a shaping amplifier 75 is provided to maintain coherency between the transmitted signals and the 27 MHz signals.

Target information in the 35 MHz output signals from mixer 61 is contained in the phase of the FM modulation. This 35 MHz signal is subsequently amplified in an IF amplifier 77 and here split into eight separate channels (only one of which is shown for the sake of clarity) by an eight-to-one power divider 79. Each of the eight channels (not numbered) includes a correlation mixer 81 (only one of which is shown) with a time delayed replica of the transmitted waveform signals as reference signals. The eight time delays here correspond to eight range gates spaced over an instrumented range. Such time delays are generated in a tapped delay line assembly 83 made up of eight identical serially connected delay channels using the 27 MHz output signal from the AFC local oscillator 63 as a reference. Each of the eight time delay channels (only two of which are shown in detail, with the six not shown being in the box labeled delay channels I) of the tapped delay line assembly 83 includes a 27 MHz quartz delay line 85 (or 85$_7$), an amplifier 87 (or 87$_7$), and a limiter 89 (or 89$_7$). Each amplifier 87 (or 87$_7$) is provided to balance the loss in the delay line 85 (or 85$_7$). Variations in delay line insertion loss and amplifier gain are removed by the limiter 89 (or 89$_7$). The output signals from the limiter 89 are split, with a first portion thereof being applied to the correlation mixer 81 and a second portion being recirculated back to the next channel (not shown) of the tapped delay line assembly 83.

Figure 2:
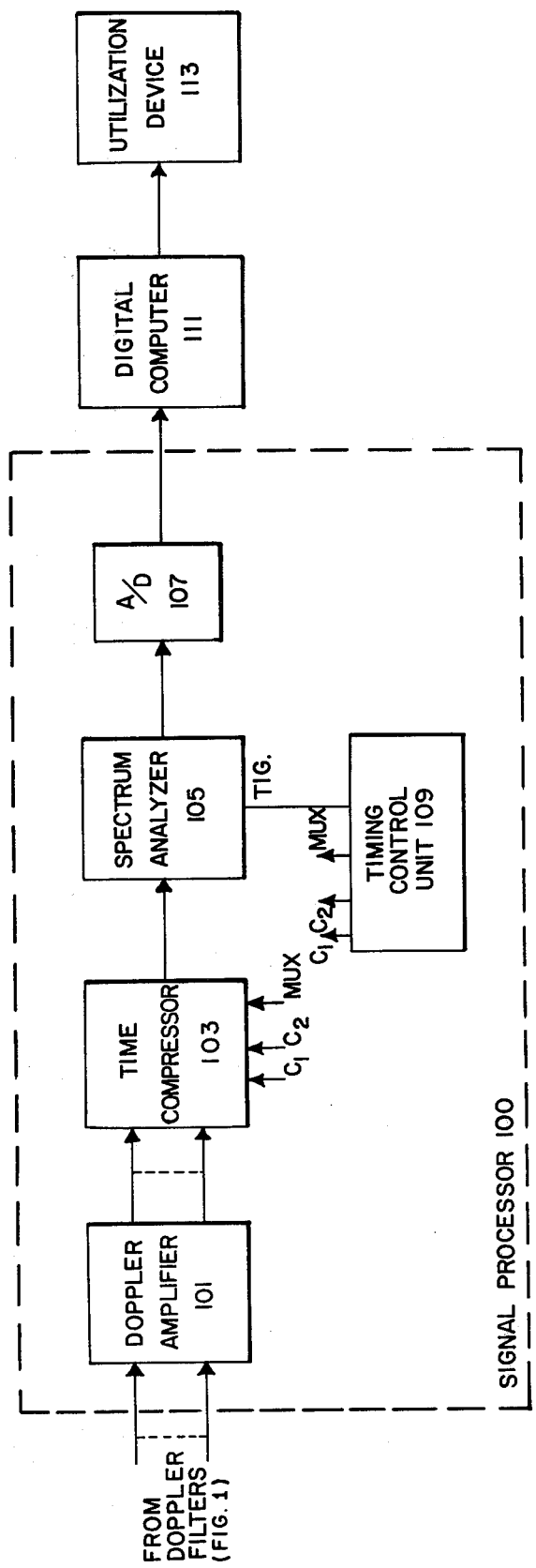
FIG. 2 is a simplified block diagram of the signal processor utilized in the radar system of FIG. 1.

The output signals from the correlation mixer 81 are split and here applied to four separate Doppler channel filters 91$_1$, 91$_2$, 91$_3$, and 91$_4$. The latter (which are of conventional construction) are provided to condition and downconvert the 8 MHz IF signals to baseband video signals for subsequent processing in a signal processor 100 (FIG. 2). It will be recognized that the signals out of the remaining seven correlation mixers (not shown) are similarly filtered finally to produce eight successive sets of four baseband video signals.

Referring now to FIG. 2, the signal processor 100 is shown to include a Doppler amplifier section 101, a time compressor 103, a spectrum analyzer 105, an analog-to-digital (A/D) converter 107, and a timing and control unit 109. The Doppler amplifier section contains thirty-two Doppler amplifiers (not shown) corresponding to each of the thirty-two (8 channels, 4 per channel) Doppler filters 91 (FIG. 1). The Doppler amplifiers are provided to perform additional Doppler channel filtering and conditioning of the input signals to the signal processor 100. The time compressor 103 and the spectrum analyzer 105 used here are described in detail in U.S. Pat. No. 4,005,417, issued Jan. 25, 1977, inventor John D. Collins, assigned to the same assignee as the present application. Suffice it to say that the time compressor 103 includes thirty-two charge coupled device (CCD) analog shift registers for sampling and storing each of the eight range channels at a 60 KHz rate for a 7.6 millisecond period. After the signals in each successive set of eight range channels have been stored, spectrum analyzer 105 is enabled to analyze the spectra represented by such sets. Before analysis of the signals in each successive set, such signals are passed through the time compressor at a 9.1 MHz rate in which the sets of signals are time compressed by a factor of 152 (equal to the ratio of the 9.1 MHz readout rate to the 60 KHz sample rate). The original Doppler frequency spectrum is thereby shifted in frequency to a range of frequencies which can be spectrum analyzed with a surface acoustic wave (SAW) delay line (not shown) within the spectrum analyzer 105.

The latter employs a chirp - Z Transform using SAW transversal filters for pulse compression arithmetic, and is capable of producing 355 filters in 100 microseconds. The SAW compression line is analogous to a comb filter bank which is read out in natural ordered serial form, since time and frequency are dependent on the chirp slope. Thus, a compressed pulse will appear at the output of the the spectrum analyzer 105 at a time proportional to the Doppler frequency of each signal with an amplitude directly related to the strength of each Doppler component.

The video data from the spectrum analyzer 105 is passed, via an A/D converter 107, to a digital computer 111, wherein the amplitude responses from the several ranges and Doppler filters are averaged and interpolated, in a manner to be described in detail hereinbelow, to derive target location. The resulting signals are passed to a utilization device 113 which may, for example, be a cathode ray display tube.

The target detection process within the digital computer 111 here consists of locating the center of the "bow-tie" of the cross-ambiguity function described hereinabove. The processing algorithms make use of the following cross-ambiguity function characteristics: (a) the "center of gravity" of the function along the Doppler axis will yield the target Doppler and, (b) the shape of the cross-ambiguity function along the range axis is that of the $J_o$ Bessel function. The latter characteristic allows the number of range delays, or range gates, which must be implemented to be reduced because, with a stored curve of the main lobe of the $J_o$ Bessel function, only two range samples need be utilized in a range interpolation algorithm. For a given transmitter peak deviation, allowing a maximum of 3.0 dB difference in the main lobe $J_o$ Bessel function, the number of range gate samples will fix the range gate spacing. Here, for example, a transmit peak deviation of 3.0 KHz will dictate a gate spacing of 9.5 kilometers.

In the Doppler estimation algorithm, an estimate is made of the spectrum center of gravity for each of the instrumented range delays in accordance with the following:

$$f_{TK} = \frac{\sum_{i=1}^{N} A_i f_i}{\sum_{i=1}^{N} A_i} \quad \text{Eq. (2)}$$

where:

$f_i$ = the Doppler filter hit location
$A_i$ = the magnitude associated with the Doppler hit
$f_{TK}$ = estimate of the Doppler frequency for the $K^{th}$ range gate.

The final Doppler estimate is obtained by averaging all eight of the previous estimates.

The Doppler estimation process also helps to pinpoint the range axis location as the two samples of the $J_o$ Bessel function required for the range interpolation algorithm reside along the Doppler axis. However, because of noise effects, the Doppler estimate will not exactly yield the Doppler line upon which the two adjacent $J_o$ Bessel function samples are located. Thus, a search is undertaken on Doppler lines ±5 filters away from the estimated Doppler. The two highest amplitude adjacent pairs are then found by search along each of the Doppler lines. When the two highest adjacent pairs are found, their amplitudes and range gate locations are utilized in the following range interpolation algorithm:

$$R_T = R_A + \frac{\Delta R}{2} - K \frac{(A-B)}{(A+B)} \quad \text{Eq. (3)}$$

where:

$R_T$ = estimated target range
$R_A$ = closer of two range gates in which the highest pair reside
$\Delta R$ = range gate spacing
$A$ = amplitude of hit in range gate A
$B$ = amplitude of hit in range gate B
$K$ = scale factor in kilometers.

Having described a preferred embodiment of this invention, it will now be evident that other embodiments incorporating our concepts may be used. For example, the disclosed way of applying the deviation of the transmitted signals to the received signals could be accomplished with a number of reference oscillators, each having different peak deviations and modulation phase shifts. The different reference oscillators would be set to the same center frequency by means of phase lock loops tied to a single, stable unmodulated reference oscillator, with the VCO in each different one of the phase lock loops modulated by an attenuated and delayed replica of the transmitted signal. Closing out the loop gain of each phase lock loop at a frequency below the transmitted modulation frequency would allow the modulation to be impressed on each one of the VCO's so that all would have identical center frequencies and the required frequency modulations to provide reference signals for correlation in the correlation mixers. It is felt, therefore, that this invention should not be restricted to its disclosed embodiment, but rather should be limited only by the spirit and scope of the appended claims.

What is claimed is:

1. The method of operating a continuous wave radar to allow measurement of range and range rate of a moving target in the presence of clutter, such method comprising the steps of:
   (a) frequency modulating a radio frequency carrier with a sinusoidal modulation signal and transmitting the resulting signal;
   (b) downconverting echo signals to first intermediate frequency signals in a band centered on a first intermediate frequency and attenuating any echo signals adjacent such frequency;
   (c) upconverting the remaining portions of the first intermediate frequency signals to produce second intermediate frequency signals and correlating such signals with differently delayed replicas of the sinusoidal modulation signals to produce a plurality of correlation signals;
   (d) time multiplexing, in accordance with the Doppler frequency of the individual correlation signals, the frequency components of each one of the correlation signals to produce successive sets of target indicating signals; and
   (e) processing the target indicating signals to determine the range and range rate of a target.

2. The method as in claim 1 wherein the processing step firstly includes determining, for each set of target indicating signals, the mean value of the frequency components.

3. The method as in claim 2 wherein the processing step secondly includes determining the particular one of the sets of target indicating signals in which the amplitudes of a pair of target indicating signals straddling the mean value of the frequency components are a maximum.

* * * * *